(12) United States Patent
Richards et al.

(10) Patent No.: US 10,703,598 B2
(45) Date of Patent: *Jul. 7, 2020

(54) SYSTEM, APPARATUS, AND METHOD FOR SENSING AUTOMATION PICKING AND STACKING

(71) Applicant: Xerox Corporation, Norwalk, CT (US)

(72) Inventors: Paul N. Richards, Fairport, NY (US); Rui Amorim, Fairport, NY (US); Gaith O. Zayed, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,740

(22) Filed: Jun. 12, 2019

(65) Prior Publication Data

US 2019/0291998 A1    Sep. 26, 2019

Related U.S. Application Data

(63) Continuation of application No. 14/709,785, filed on May 12, 2015, now Pat. No. 10,364,117.

(51) Int. Cl.

| | |
|---|---|
| *B65H 29/24* | (2006.01) |
| *B65H 43/02* | (2006.01) |
| *B25J 15/06* | (2006.01) |
| *B25J 9/16* | (2006.01) |
| *B25J 15/00* | (2006.01) |
| *B65H 3/08* | (2006.01) |

(Continued)

(52) U.S. Cl.
CPC ............ *B65H 29/241* (2013.01); *B25J 9/161* (2013.01); *B25J 9/1612* (2013.01); *B25J 9/1674* (2013.01); *B25J 9/1687* (2013.01); *B25J 15/0052* (2013.01); *B25J 15/0616* (2013.01); *B65H 3/0816* (2013.01); *B65H 5/14* (2013.01); *B65H 7/04* (2013.01); *B65H 43/02* (2013.01); *B65H 2301/4212* (2013.01); *B65H 2301/42172* (2013.01); *B65H 2406/34* (2013.01); *B65H 2511/51* (2013.01); *B65H 2511/515* (2013.01); *B65H 2511/52* (2013.01); *B65H 2555/31* (2013.01); *G05B 2219/39558* (2013.01); *Y10S 901/09* (2013.01)

(58) Field of Classification Search
CPC .............................. B65H 29/241; B65H 43/02
See application file for complete search history.

(56) References Cited

U.S. PATENT DOCUMENTS

| | | | | |
|---|---|---|---|---|
| 4,533,133 A | * | 8/1985 | Hams .................... | B65H 7/125 271/101 |
| 9,815,653 B2 | | 11/2017 | Richards et al. | |

* cited by examiner

*Primary Examiner* — Howard J Sanders
(74) *Attorney, Agent, or Firm* — Simpson & Simpson, PLLC (57) ABSTRACT

An apparatus for picking a product, including a control circuit, at least one vacuum cup arranged to adhere at least one sheet of material to the at least one vacuum cup, and at least one sensor configured to monitor an area proximate the at least one vacuum cup, and transmit at least one signal regarding a presence of at least one sheet of material in the area, wherein the apparatus is arranged to displace to a second location while continuously monitoring the area proximate the at least one vacuum cup, the at least one sensor is configured to transmit the at least one signal, and the control circuit is arranged to determine, responsive to the at least one signal, the sheet of material is not present in the area, and generate an error signal indicating that the at least one sheet of material is not present in the area.

20 Claims, 7 Drawing Sheets

(51) Int. Cl.
*B65H 5/14* (2006.01)
*B65H 7/04* (2006.01)

SYSTEM, APPARATUS, AND METHOD FOR SENSING AUTOMATION PICKING AND STACKING

CROSS-REFERENCE TO RELATED APPLICATIONS

This application is filed under 35 U.S.C. § 120 as a continuation of U.S. Non-Provisional patent application Ser. No. 14/709,785, filed on May 12, 2015, which application is incorporated herein in its entirety.

FIELD

The present disclosure relates to a system, apparatus and method for sensing automation picking and stacking. In particular, the present disclosure relates to sensors to determine if material is picked by vacuum cups for stacking.

BACKGROUND

Known automated systems for picking and stacking material, such as print media, use a vacuum cup to pick the material and then displace the cup and media to stack the material in a different location. However, at times the cup fails to pick up the required material or the required material is dropped during transit to the stacking location. As a result, the stacked material is incomplete and unsuitable for use. The known systems do not have a means for determining that stacked material is missing material that failed to be transported to the stacking location.

SUMMARY

According to aspects illustrated herein, there is provided an apparatus for picking a product, comprising a control circuit, at least one vacuum cup arranged to adhere, with a negative pressure and at a first location, at least one sheet of material to the at least one vacuum cup, and at least one sensor configured to monitor an area proximate the at least one vacuum cup, and transmit at least one signal regarding a presence of at least one sheet of material in the area, wherein the apparatus is arranged to displace to a second location while continuously monitoring, using the at least one sensor, the area proximate the at least one vacuum cup, the at least one sensor is configured to transmit the at least one signal when the at least one sheet of material is not detected in the area, or the at least one sheet of material is detected in the area, and the control circuit is arranged to determine, responsive to the at least one signal, the at least one sheet of material is not present in the area, and generate an error signal indicating that the at least one sheet of material is not present in the area.

According to aspects illustrated herein, there is provided a method of sensing material during a picking and stacking process, comprising displacing, using a robotic arm, at least one apparatus such that at least one vacuum cup for the at least one apparatus is aligned with at least one sheet of material in a first direction, creating, using at least one vacuum pump, negative pressure with the at least one vacuum cup, adhering, with the negative pressure, the at least one sheet of material to the at least one vacuum cup, continuously monitoring, using at least one sensor, an area proximate the at least one vacuum cup, displacing, using the robotic arm, the apparatus to a second location, detecting, using the at least one sensor, that the at least one sheet of material is not in the area, transmitting, using the at least one sensor, at least one signal to a control circuit, the at least one signal indicating that the at least one sensor has not detected the at least one sheet in the area, and generating, using the control circuit and in response to the at least one signal, an error signal indicating that the at least one sheet of material is not present in the area.

According to aspects illustrated herein, there is provided a system for picking and stacking a product, comprising a robotic arm, and at least one apparatus connected to the robotic arm, the at least one apparatus including a control circuit, at least one vacuum cup arranged to adhere, at a first location, a sheet of material of a plurality of sheets of material to the at least one vacuum cup, at least one sensor configured to continuously monitor an area proximate the at least one vacuum cup, and transmit at least one signal when the sheet of material is detected in the area, or the sheet of material is not detected in the area, wherein the plurality of sheets of material are arranged in a sequence, and the control circuit is configured to determine, using the at least one signal, that the sheet of material is not present in the area at the second location, determine an intended position of the sheet of material within the sequence, and generate an error signal indicating that the sheet of material is not present in the second location, and the intended position of the sheet in the sequence.

According to aspects illustrated herein, there is provided an apparatus for picking a product, including: a control circuit; at least one vacuum cup arranged to create negative pressure and adhere, with the negative pressure and at a first location, the at least one sheet of material to the at least one vacuum cup; and at least one sensor configured to monitor an area proximate the at least one vacuum cup and transmit at least one signal regarding a presence of at least one sheet of material in the area. The apparatus is arranged to displace to a second location. The at least one sensor is configured to transmit the at least one signal when the at least one sheet of material is not detected in the area or the at least one sheet of material is detected in the area. The control circuit is arranged to determine, responsive to the at least one signal, the at least one sheet of material is not present in the area and generate an error signal indicating that the at least one sheet of material is not present in the area.

According to aspects illustrated herein, there is provided a method of sensing material during a picking and stacking process, including: displacing, using a robotic arm, at least one apparatus such that at least one vacuum cup for the at least one apparatus is aligned with at least one sheet of material in a first direction; creating, using at least one vacuum pump, negative pressure with the at least one vacuum cup; adhering, with the negative pressure, the at least one sheet of material to the at least one vacuum cup; displacing, using the robotic arm, the apparatus to a second location; monitoring, using at least one sensor, an area proximate the at least one vacuum cup; detecting, using the at least one sensor, that the at least one sheet of material is not in the area; transmitting, using the at least one sensor, at least one signal to a control circuit, the at least one signal indicating that the at least one sensor has not detected the at least one sheet in the area; and generating, using the control circuit and in response to the at least one signal, an error signal indicating that the at least one sheet of material is not present in the area.

According to aspects illustrated herein, there is provided a system for picking and stacking a product, including: a robotic arm; and at least one apparatus connected to the robotic arm. The at least one apparatus includes: a control circuit; at least one vacuum cup arranged to create negative pressure and adhere, with the negative pressure and at a first location, the plurality of sheets of material to the at least one vacuum cup; at least one sensor configured to monitor an area proximate the at least one vacuum cup and transmit at least one signal when a sheet of material, included in a plurality of sheets of material, is detected in the area or a sheet of material, included in a plurality of sheets of material, is not detected in the area. The robotic arm and the apparatus are arranged to displace to a second location. The plurality of sheets of material is arranged in a sequence. The control circuit is configured to: determine, using the at least one signal, that the sheet of material is not present in the area at the second location; determine a position of the sheet of material within the sequence; and generate an error signal indicating that the sheet of material is not present in the second location and the position of the sheet in the sequence.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Moreover, although any methods, devices or materials similar or equivalent to those described herein can be used in the practice or testing of these embodiments, some embodiments of methods, devices, and materials are now described.

Figure 1:
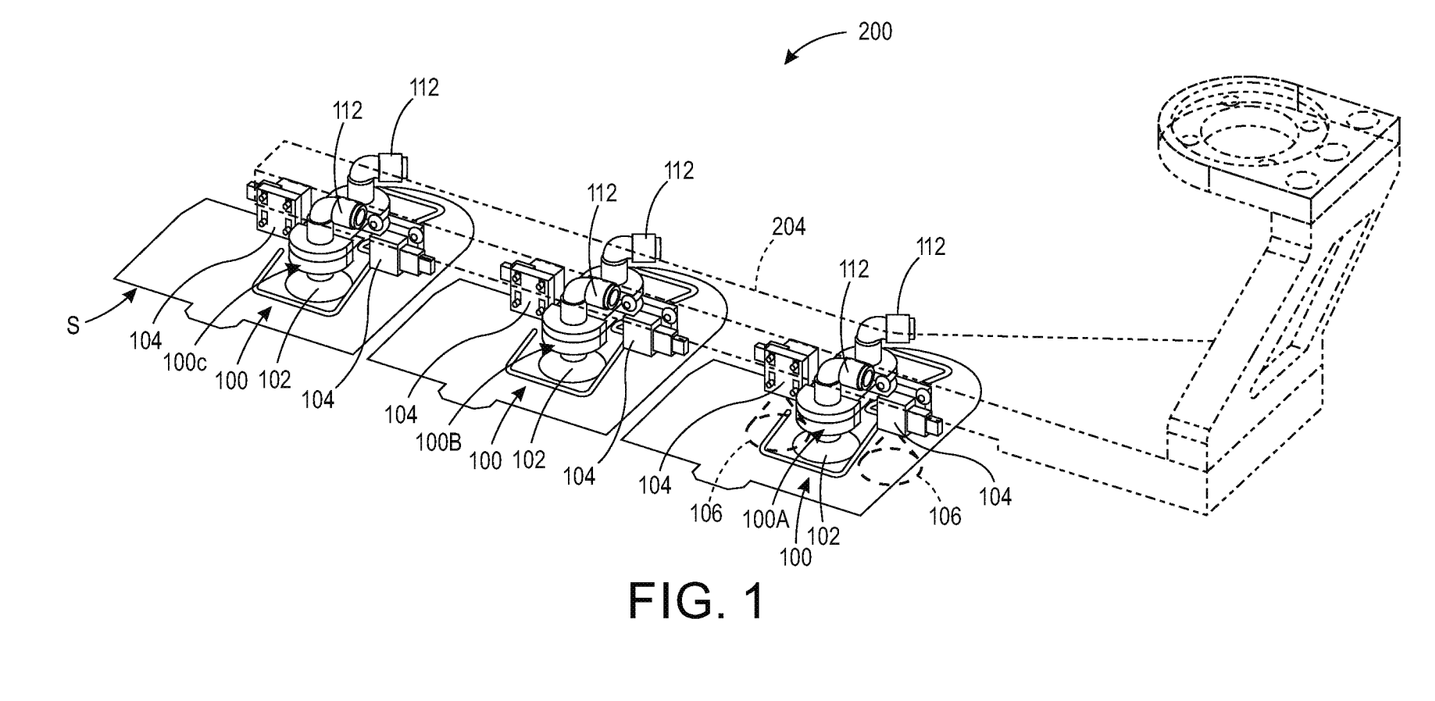
FIG. 1 is a top perspective view of a system including apparatus for picking and stacking a product.

FIG. 1 is a top perspective view of a system including apparatus 100 for picking and stacking a product.

Figure 2:
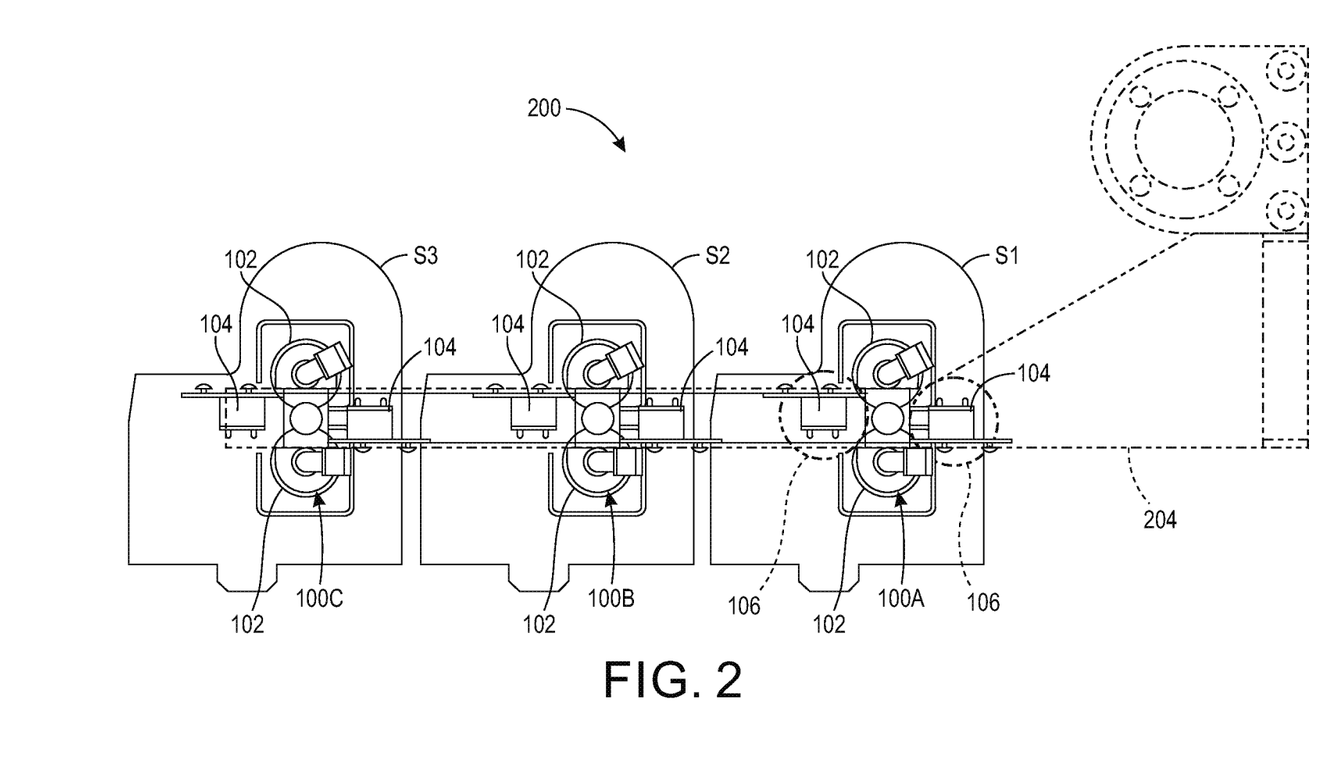
FIG. 2 is a top view of the system of FIG. 1.

FIG. 2 is a top view of the system of FIG. 1.

Figure 3:
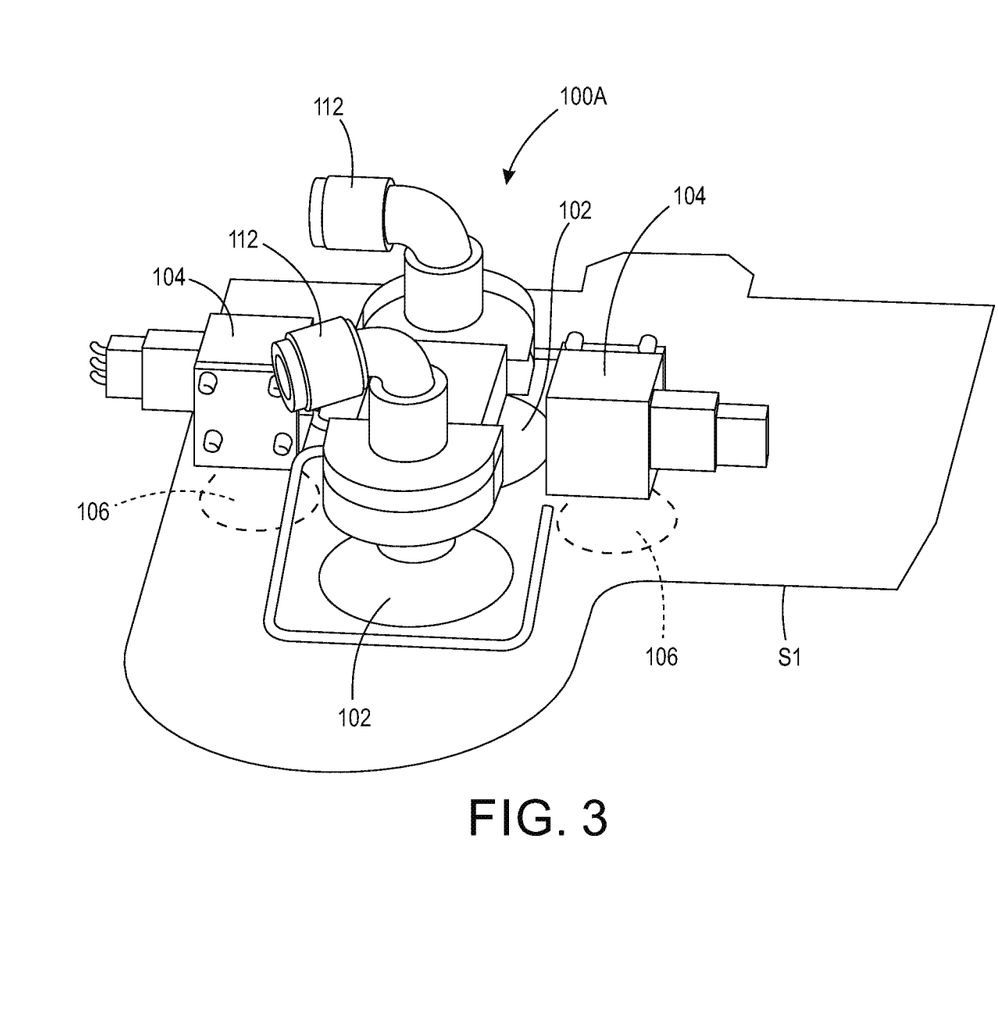
FIG. 3 is a detail of an apparatus in FIG. 1.

FIG. 3 is a detail of an apparatus in FIG. 1.

Figure 4:
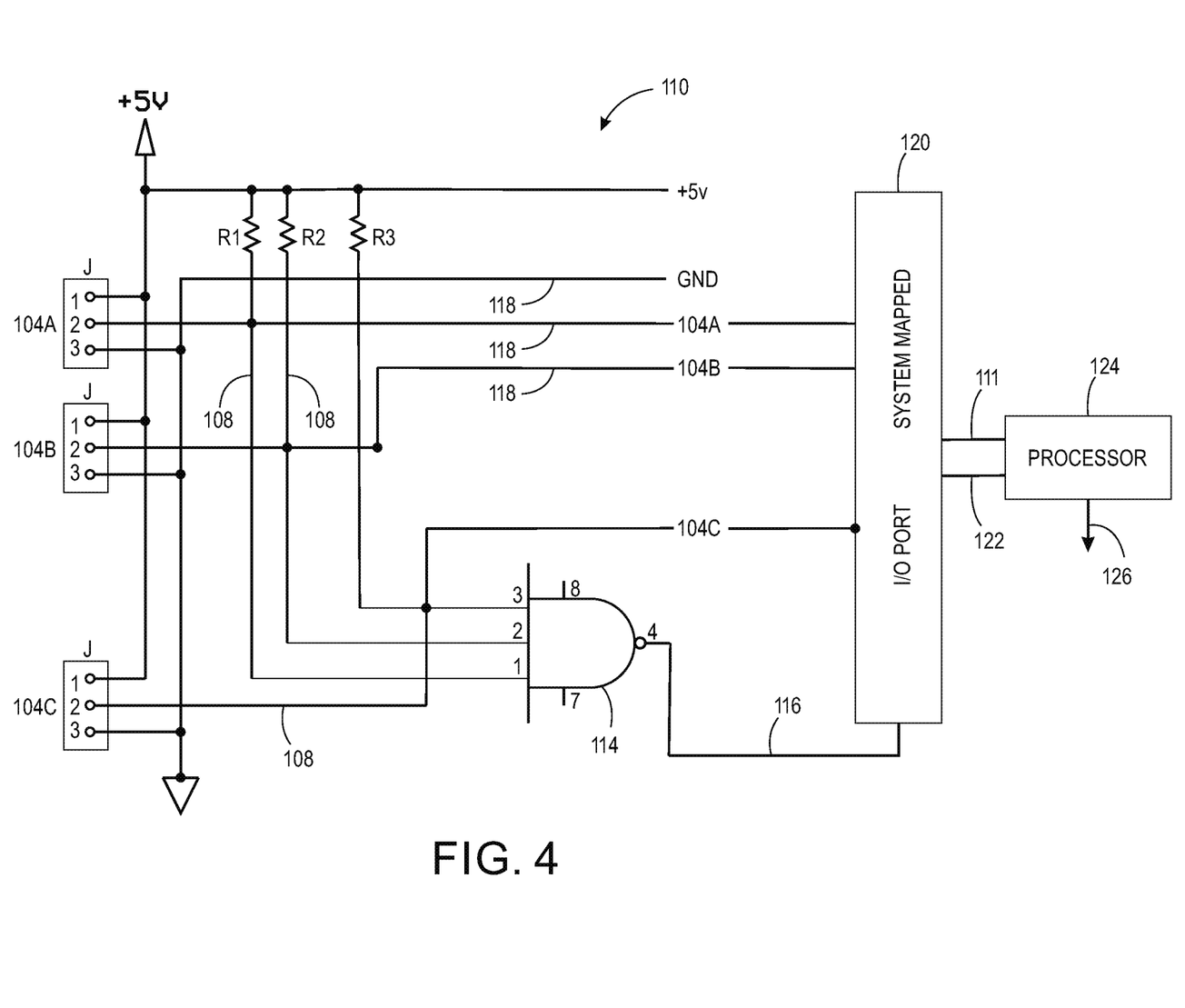
FIG. 4 is a schematic diagram of a control circuit for the apparatus in FIG. 3.

FIG. 4 is a schematic diagram of a control circuit for the apparatus in FIG. 3. The following should be viewed in light of FIGS. 1 through 4. Apparatus 100 for picking a product includes at least one vacuum cup 102 and at least one sensor 104. Cup or cups 102 are arranged to create negative pressure. Sensor or sensors 104 are configured to monitor area 106 proximate cup or cups 102 and transmit at least one signal 108 regarding a presence of at least one sheet S of material M in area 106. For example, signal 108 is transmitted when at least one sheet S is present in area 106, or signal 108 is transmitted when at least one sheet S is not present in area 106. Unless stated otherwise, the discussion that follows is directed to a plurality of cups 102 for each apparatus 100 and a plurality of sensors 104 for each apparatus 100. However, it should be understood that the discussion is applicable to an apparatus 100 having one or both of a single cup 102 and a single sensor 104.

Apparatus 100 includes control circuit 110 arranged to determine, responsive to at least one signal 108, at least one sheet of material S is not present in area 106, and generate error signal 111 indicating that at least one sheet of material S is not present in area 106.

Figure 5A:
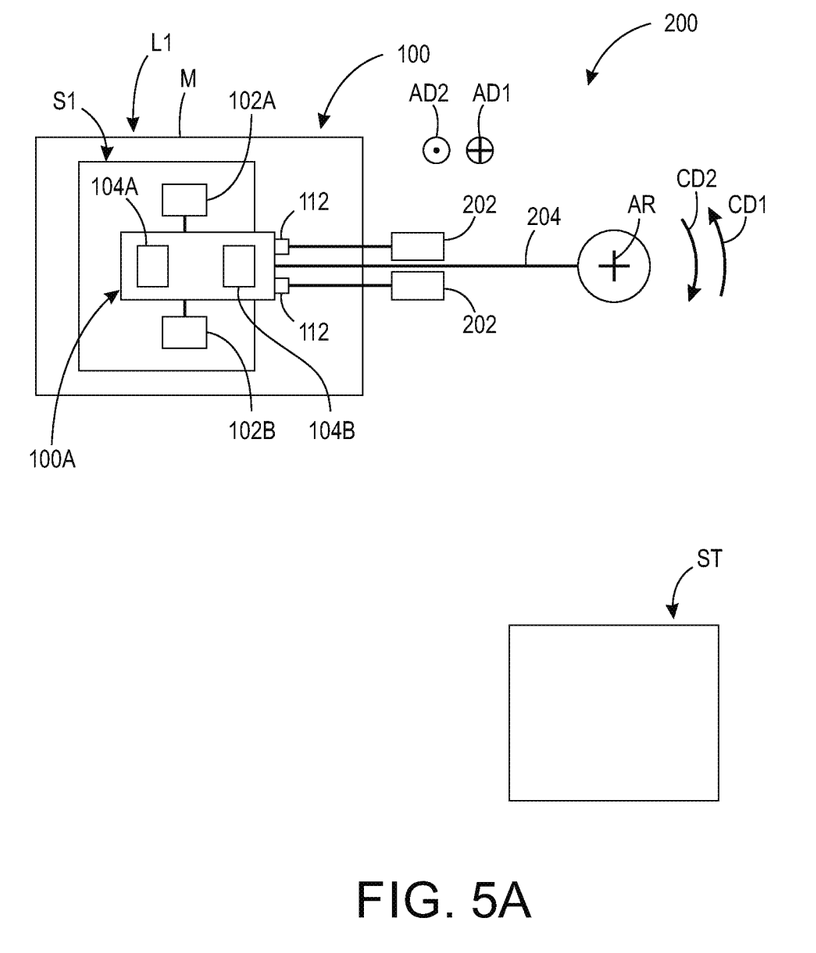
FIGS. 5A and 5B are respective block diagrams of the system in FIG. 1 showing one apparatus; and, FIG. 6 is a flow chart illustrating operation of the control circuit of FIG. 4.
Figure 5B:
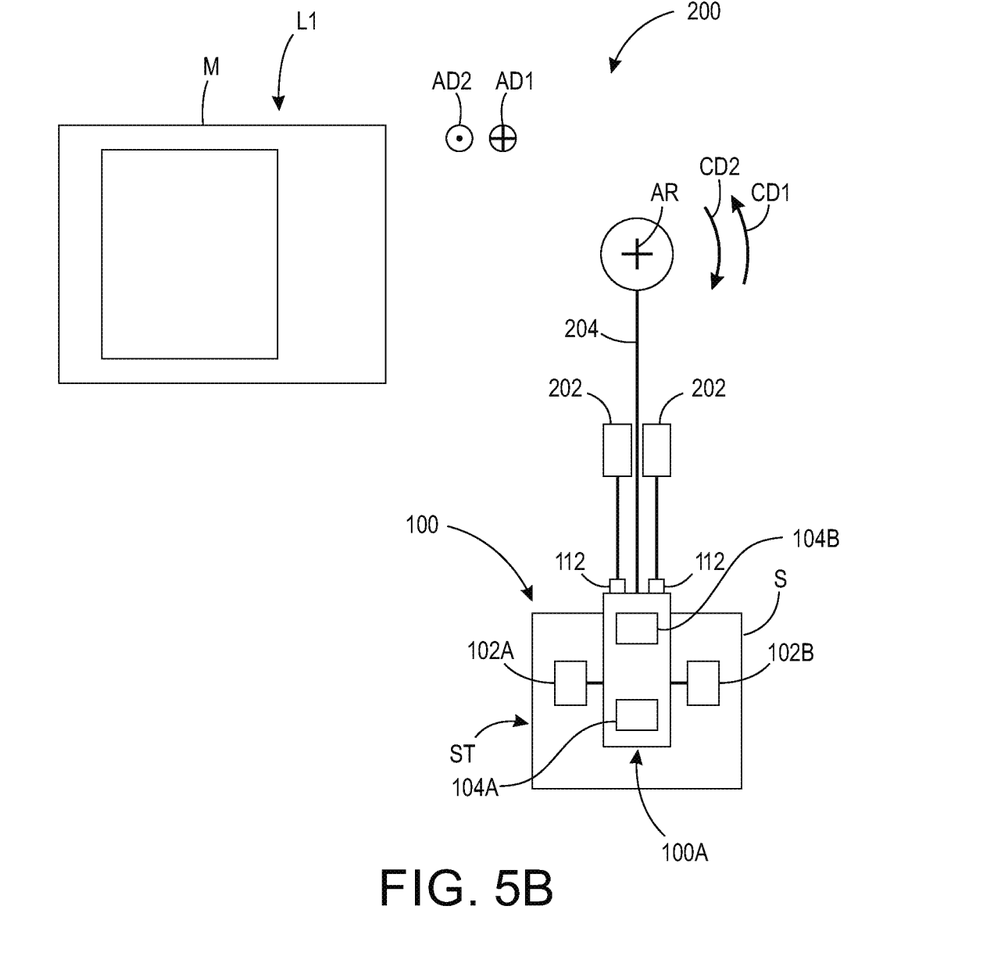

FIGS. 5A and 5B are respective block diagrams of system 200 in FIG. 1 showing one apparatus 100. The following should be viewed in light of FIGS. 1 through 5B. Apparatus 100 includes at least one port 112 arranged to be connected to at least one vacuum pump 202. For example, each cup 102 has a respective port 112 connected to a respective pump 202. Vacuum pumps 202 are arranged to generate negative pressures at cups 102. By "negative pressure" we mean a pressure less than the ambient air pressure surrounding cup 102. In an example embodiment, system 200 includes robotic arm 204 to which one or more apparatuses 100 are connected. In an example embodiment, arm 204 is rotatable about axis AR in circumferential directions CD1 and CD2. In an example embodiment, arm 204 is displaceable parallel to axis AR (in directions AD1 and AD2 out of and into the sheet, respectively).

As shown in FIG. 5A, arm 204 is controllable to rotate in direction CD1 to position apparatus 100A at position L1 above sheet S1 in direction AD1. Vacuum pumps 202A and 202B are arranged to generate negative pressure at cups 102A and 102B, respectively. The negative pressure is arranged to draw sheet S1 toward cups 102A and 102B in direction AD1 and adhere sheet S1 to cups 102A and 102B. Sensors 104A and 104B are configured to determine that sheet S1 has not adhered to cups 102A and 102B, that is, sheet S1 is not in area 106. Thus, apparatus 100A detects and reports a failed picking operation for sheet S1.

As shown in FIG. 5B, arm 204 is controllable to rotate from position L1 in direction CD1 to position sheet S1 over stack ST in direction AD1. The negative pressure is released from apparatus 100 so that sheet S1 falls in direction AD2 onto stack ST. During the rotation of arm 204 and sheet S1 in direction CD1, sheet S1 can become disconnected from cups 102A and 102B and apparatus 100A. In an example embodiment, sensors 104A and 104B are configured to determine that sheet S1 has disengaged from cups 102 (is not in area 106) during displacement to stack ST.

System 200, including multiple apparatuses 100 is shown in FIGS. 1 and 2. In the example of FIGS. 1 and 2, system 200 includes three apparatuses 100 and a plurality of sheets S, for example, each apparatus 100 is arranged to pick up a respective sheet S by adhering the respective sheet with negative pressure at the respective cups 102. Although three apparatuses 100 are shown in FIGS. 1 and 2, it should be understood that other numbers of apparatuses 100 can be used in system 200 and that system 200 is not limited to a particular number of apparatuses 100.

Respective sensors 104 for each apparatus 100 are configured to transmit respective signals 108 to control circuit 110 when: a sheet S, associated with the apparatus, is not detected in area 106 during a pickup operation; or when a sheet S is not detected in area 106 during a stacking operation. Control circuit 110 is arranged to generate, in response to signal 108, error signal 111.

In an example embodiment, for configurations of apparatus 100 including a plurality of sensors 104, apparatus 100 is configured to generate signal 111 if only one of the sensors 104 in the plurality of sensors 104 determines that a sheet S is not within area 106. In the example of FIG. 4, circuit 100 includes NAND gate 114. If the inputs to gate 114 (from sensors 104) on lines 108 are not all the same, the NAND gate outputs a low signal, which is inverted to a high signal on line 116. Lines 118 carry signals from sensors 104 to Input/Output (I/O) port 120. In response to a high signal on line 116, port 120 transmits error signal 111. Data from signals 118 is transmitted on line(s) 122.

In an example embodiment, control circuit 110 includes processor 124. For a system 200 including multiple apparatuses 100, the respective sheets S are arranged in a sequence. For example, sheet S2 follows sheet S1 and sheet S3 follows sheet S2 in a stacking sequence. As further described below, stacking at location ST typically involves multiple iterations of picking sheets S, displacing the sheets to location ST, and releasing the sheets at location ST. Thus, the sequence can includes multiple repetitions of the S1 through S3 sequence. As noted above, sensors 104 are configured to transmit signal or signals 108 to control circuit 110 regarding presence of the respective sheets S in respective areas 106. In response to signal or signals 108 and 118, the control circuit, for example processor 124, is configured to determine a position, in the sequence, of the sheet or sheets not detected in area 106. Note that the detection of the position can be accomplished for only a single sheet S not detected in area 106 or for multiple sheets S not detected in areas 106. For example, if a stack requires four iterations of the S1 to S3 sequence for a total of 12 sheets in the stack, and the middle sheet in the third iteration (eighth sheet in the stack) is not detected, processor outputs signal 126 identifying the eighth sheet as being missing in the stack. For example, if a stack requires four iterations of the S1 to S3 sequence for a total of 12 sheets in the stack, and the middle sheets in the second and third iterations (fifth and eighth sheets in the stack) is not detected, processor outputs signal 126 identifying the fifth and eighth sheets as being missing in the stack.

Apparatus 100 is controllable such that negative pressure is created, simultaneously, by less than all of vacuum cups 102; or the negative pressure is created, simultaneously, by every vacuum cup 102. For example, negative pressure is created by cup 102A at a first point in time and at a second point in time, following the first point in time, negative pressure is created by cup 102B. The negative pressure at cup 102A can be maintained or released when the negative pressure is created by cup 102B.

Figure 6:
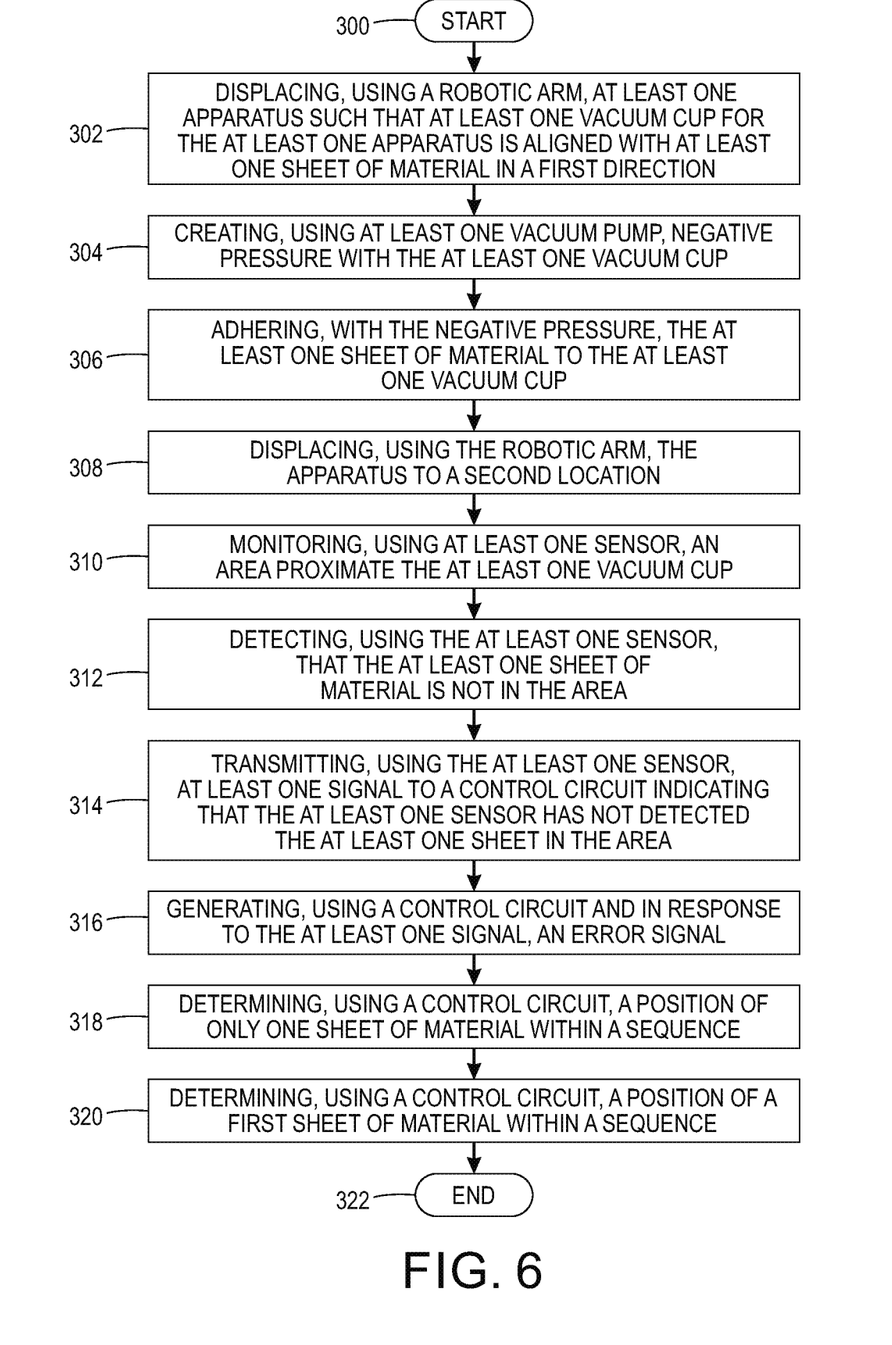

FIG. 6 is a flow chart illustrating a method of picking and stacking a product. Although the method in FIG. 6 is depicted as a sequence of numbered steps for clarity, no order should be inferred from the numbering unless explicitly stated. The method starts at Step 300. Step 302 displaces, using a robotic arm, at least one apparatus such that at least one vacuum cup for the at least one apparatus is aligned with at least one sheet of material in a first direction. Step 304 creates, using at least one vacuum pump, negative pressure with the at least one vacuum cup. Step 306 adheres, with the negative pressure, the at least one sheet of material to the at least one vacuum cup. Step 308 displaces, using the robotic arm, the apparatus to a second location. Step 310 monitors, using at least one sensor, an area proximate the at least one vacuum cup. Step 312 detects, using the at least one sensor, that the at least one sheet of material is not in the area. Step 314 transmits, using the at least one sensor, at least one signal to a control circuit, the at least one signal indicating that the at least one sensor has not detected the at least one sheet in the area. Step 316 generates, using a control circuit and in response to the at least one signal, an error signal indicating that the at least one sheet of material is not present in the area.

In an example embodiment, the at least one sensor includes a plurality of sensors and detecting, using the at least one sensor, that the at least one sheet of material is not in the area includes detecting, with less than all of the sensors included in the plurality of sensors, that the at least one sheet of material is not in the area.

In an example embodiment, the at least one sensor includes a plurality of sensors and detecting, using the at least one sensor, that the at least one sheet of material is not in the area.

In an example embodiment, the at least one sheet of material includes a plurality of sheets of material arranged in a sequence and step 318 determines, using the control circuit and the at least one signal, a position in the sequence for only one single sheet of material, included in the at least one sheet of material, not detected in the area. Further, generating the error signal includes generating the error signal including the position in the sequence.

In an example embodiment, the at least one sheet of material includes a plurality of sheets of material arranged in a sequence and step 320 determines, using the control circuit and the at least one signal, a position in the sequence for a sheet of material, included in the at least one sheet of material, not detected in the area. Further, generating the error signal includes generating the error signal including the position in the sequence.

Advantageously, the method described above, apparatus 100 and system 200 detect failed picking, transfer, and/or stacking operations; for example: failing to pick up a sheet; losing a sheet during transfer to location ST; or losing a sheet at location ST. As a result, the problems noted above with respect to transferring and stacking material are greatly reduced if not eliminated. Further, not only are failed operations detected, but an additional level of information is provided, namely, identification of the lost sheet or sheets and the location of the lost sheet or sheets within a sequence of stacked sheets. For example, if there are fifty sheets in a finished stack and the twentieth sheet in the stack is lost, the method described above, apparatus 100 and system 200 identify the sheet as being the twentieth sheet and provides information, for example to an operator, so that the operator can manually replace the missing sheet. Thus, the problem is quickly remedied using the already stacked sheets, avoiding the need to redo the entire stack.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for picking a product, comprising:
a control circuit;
at least one vacuum cup arranged to adhere, with a negative pressure and at a first location, at least one sheet of material to the at least one vacuum cup; and,
at least one sensor configured to:
monitor an area proximate the at least one vacuum cup; and,
transmit at least one signal regarding a presence of at least one sheet of material in the area, wherein:
the apparatus is arranged to displace to a second location while continuously monitoring, using the at least one sensor, the area proximate the at least one vacuum cup;
the at least one sensor is configured to transmit the at least one signal when:
the at least one sheet of material is not detected in the area; or,
the at least one sheet of material is detected in the area; and, the control circuit is arranged to:
   determine, responsive to the at least one signal, the at least one sheet of material is not present in the area; and,
   generate an error signal indicating that the at least one sheet of material is not present in the area.

2. The apparatus as recited in claim 1, wherein:
the at least one sheet of material includes a plurality of sheets of material; and,
the at least one vacuum cup includes a plurality of vacuum cups arranged to adhere, with the negative pressure, the plurality of sheets of material to the plurality of vacuum cups.

3. The apparatus as recited in claim 1, wherein the at least one sensor includes a plurality of sensors configured to transmit the at least one signal when less than all of the sensors included in the plurality of sensors:
   do not detect the at least one sheet of material in the area; or,
   detect the at least one sheet of material in the area.

4. The apparatus as recited in claim 1, wherein the at least one sensor includes a plurality of sensors configured to transmit the at least one signal when only one single sensor included in the plurality of sensors:
   does not detect the at least one sheet of material in the area; or,
   detects the at least one sheet of material in the area.

5. The apparatus as recited in claim 1, wherein:
the at least one sheet of material includes a plurality of sheets of material arranged in a sequence; and,
when the control circuit determines that only one single sheet of material, included in the at least one sheet of material, is not present in the area, the control circuit is configured to determine a position of the only one single sheet of material within the sequence.

6. The apparatus as recited in claim 1, wherein when the control circuit determines that a first sheet of material, included in the at least one sheet of material, is not present in the area, the control circuit is configured to determine a position of the first sheet of material within the sequence.

7. The apparatus as recited in claim 1, wherein the at least one vacuum cup includes a plurality of vacuum cups.

8. The apparatus as recited in claim 1, wherein the at least one sensor consists of a single sensor.

9. The apparatus as recited in claim 1, wherein the at least one sensor includes a plurality of sensors.

10. The apparatus as recited in claim 1, wherein the at least one vacuum cup comprises at least two vacuum cups and the at least one sensor comprises at least one sensor associated with each vacuum cup of the at least two vacuum cups.

11. The apparatus as recited in claim 10, wherein each of the at least one sensors associated with each of the at least two vacuum cups are connected by the control circuit.

12. The apparatus as recited in claim 10 wherein the control circuit further comprises a NAND gate and each of the at least one sensors associated with each of the at least two vacuum cups are connected by the NAND gate.

13. A method of sensing material during a picking and stacking process, comprising:
   displacing, using a robotic arm, at least one apparatus such that at least one vacuum cup for the at least one apparatus is aligned with at least one sheet of material in a first direction;
   creating, using at least one vacuum pump, negative pressure with the at least one vacuum cup;
   adhering, with the negative pressure, the at least one sheet of material to the at least one vacuum cup;
   continuously monitoring, using at least one sensor, an area proximate the at least one vacuum cup;
   displacing, using the robotic arm, the apparatus to a second location;
   detecting, using the at least one sensor, that the at least one sheet of material is not in the area;
   transmitting, using the at least one sensor, at least one signal to a control circuit, the at least one signal indicating that the at least one sensor has not detected the at least one sheet in the area; and,
   generating, using the control circuit and in response to the at least one signal, an error signal indicating that the at least one sheet of material is not present in the area.

14. The method as recited in claim 13, wherein:
the at least one sensor includes a plurality of sensors; and,
detecting, using the at least one sensor, that the at least one sheet of material is not in the area includes detecting, with less than all of the sensors included in the plurality of sensors, that the at least one sheet of material is not in the area.

15. The method as recited in claim 13, wherein:
the at least one sensor includes a plurality of sensors; and,
detecting, using the at least one sensor, that the at least one sheet of material is not in the area includes detecting, with only one single sensor included in the plurality of sensors, that the at least one sheet of material is not in the area.

16. The method as recited in claim 13, wherein the at least one sheet of material includes a plurality of sheets of material arranged in a sequence, the method further comprising:
   determining, using the control circuit and the at least one signal, a position in the sequence for only one single sheet of material, included in the at least one sheet of material, not detected in the area, wherein generating the error signal includes generating the error signal including the position in the sequence.

17. The method as recited in claim 13, wherein the at least one sheet of material includes a plurality of sheets of material arranged in a sequence, the method further comprising:
   determining, using the control circuit and the at least one signal, a position in the sequence for a first sheet of material, included in the at least one sheet of material, not detected in the area, wherein generating the error signal includes generating the error signal including the position in the sequence.

18. The method as recited in claim 13, wherein detecting, using the at least one sensor, that the at least one sheet of material is not in the area is performed while adhering the at least one sheet of material to the at least one vacuum cup, while displacing the apparatus to a second location, and while stacking the at least one sheet of material.

19. A system for picking and stacking a product, comprising:
   a robotic arm; and,
   at least one apparatus connected to the robotic arm, the at least one apparatus including:
      a control circuit;
      at least one vacuum cup arranged to adhere, at a first location, a sheet of material of a plurality of sheets of material to the at least one vacuum cup;
      at least one sensor configured to:
         continuously monitor an area proximate the at least one vacuum cup; and, transmit at least one signal when:
the sheet of material is detected in the area; or,
the sheet of material is not detected in the area,
wherein:
the plurality of sheets of material are arranged in a sequence; and,
the control circuit is configured to:
determine, using the at least one signal, that the sheet of material is not present in the area at the second location;
determine an intended position of the sheet of material within the sequence; and,
generate an error signal indicating:
that the sheet of material is not present in the second location; and,
the intended position of the sheet in the sequence.

20. The system as recited in claim 19, wherein the at least one vacuum cup comprises at least two vacuum cups and the at least one sensor comprises at least one sensor associated with each vacuum cup of the at least two vacuum cups.

\* \* \* \* \*